(12) United States Patent
Tanaka (10) Patent No.: US 8,130,331 B2
(45) Date of Patent: Mar. 6, 2012

(54) PROJECTION-TYPE DISPLAY APPARATUS

(75) Inventor: Takaaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 12/821,374

(22) Filed: Jun. 23, 2010

(65) Prior Publication Data

US 2010/0328560 A1     Dec. 30, 2010

(30) Foreign Application Priority Data

Jun. 26, 2009   (JP) ................................. 2009-151954

(51) Int. Cl.
G02F 1/1335   (2006.01)

(52) U.S. Cl. ..................................... 349/5; 349/8; 349/9

(58) Field of Classification Search ............... 349/5, 8–9
See application file for complete search history.

(56) References Cited

U.S. PATENT DOCUMENTS

| 5,161,042 A | 11/1992 | Hamada |
| 2006/0290889 A1 | 12/2006 | Robinson et al. |

FOREIGN PATENT DOCUMENTS

| JP | 4-060538 | 2/1992 |
| JP | 2003-185969 | 7/2003 |
| JP | 2005-065055 | 3/2005 |

*Primary Examiner* — Phu Vu
(74) *Attorney, Agent, or Firm* — Hamre, Schumann, Mueller & Larson, P.C.

(57) ABSTRACT

Provided are an illumination optical system allowing light beams to be condensed and enter an illumination area at different angles from each other, color separating elements that separate colors of the light beams from the illumination optical systems, liquid crystal light valves that modulate the color lights to form image light for the right and the left eyes, a color combining element that combines the color light beams, a wavelength-selective polarization rotating element that rotates the polarization direction of a predetermined color light so as to align the polarization direction with that of a light beam of another color, and a projection lens that magnifies and projects images. The liquid crystal light valves are provided with an incident side microlens array that causes the light beams for the right and the left eyes to pass respectively through the right and the left eye image pixels, and an exit side microlens array that condenses the light that has passed through the pixels. The projection lens is provided with a polarized light separating element that causes the polarization directions of image light for the right and the left eyes to be orthogonal to each other. Using one projection-type display apparatus, a highly efficient stereoscopic image can be displayed with little flicker and cross talk of image light for the right eye and for the left eye.

12 Claims, 11 Drawing Sheets

Light Intensity Distribution

Light Intensity Distribution

Light Intensity Distribution

PROJECTION-TYPE DISPLAY APPARATUS

BACKGROUND OF THE INVENTION

1. Field of the Invention

The present invention relates to a projection-type display apparatus that irradiates an image formed on a light valve with illumination light, and magnifies and projects the image on a screen using a projection lens, and in particular relates to a projection-type display apparatus for stereoscopic display.

2. Description of Related Art

Figure 11:
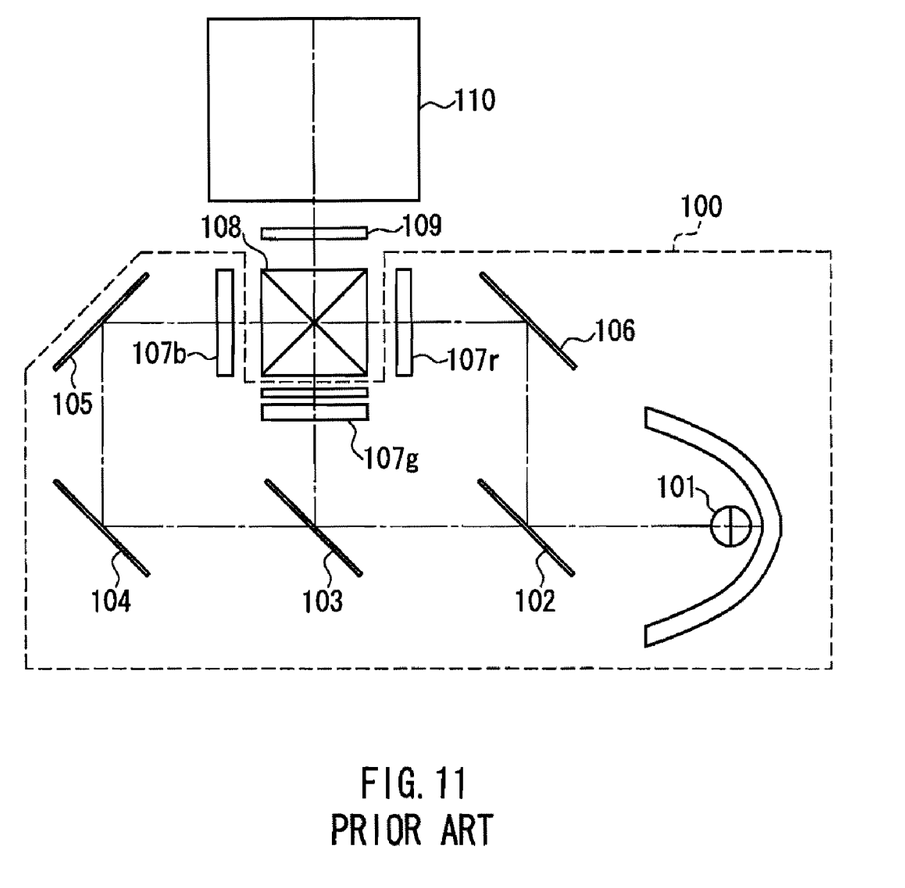
FIG. 11 is a diagram showing the configuration of a conventional projection-type display apparatus.

JP 2005-65055A, for example, discloses that a video display apparatus for stereoscopic display is composed of one projection-type display apparatus that uses liquid crystal panels for light valves, aiming to make the apparatus small and easy to be installed, and enabling stable stereoscopic display images to be obtained. This conventional projection-type display apparatus is shown in FIG. 11.

An optical system 100 that forms blue, green, and red light images is constituted by a light source lamp 101, dichroic mirrors 102 and 103 for color separation, reflection mirrors 104 to 106, and liquid crystal panels 107r, 107g, and 107b for image formation. Blue, green, and red light beams from the liquid crystal panels 107r, 107g, and 107b are combined by a combining prism 108, and the combined light is projected using a projection lens 110 via polarization rotation liquid crystal 109. The polarization rotation liquid crystal 109 switches the polarization direction of the projection light between 0° and 90°.

Blue, green, and red light beams for the right eye and for the left eye are emitted alternately from the optical system 100 for each field. At this time, the timing for emitting the green light for the right eye and for the left eye is shifted by one field relative to the timing for emitting the red and blue light for the right eye and for the left eye. Furthermore, the polarization direction of the projected light from the combining prism 108 is switched between 0° and 90° for each field by the polarization rotation liquid crystal 109. Accordingly, stereoscopic images can be viewed using polarization glasses.

In order to control polarization at a high speed, OCB mode liquid crystal whose response speed is about 5 msec, ferroelectric liquid crystal having high-speed response on the order of microseconds, or the like is used as the polarization rotation liquid crystal 109. With this configuration, it is possible to display stereoscopic video with little flicker, using one small projection-type display apparatus for displaying projection images, for which installation adjustment is easy.

However, since an image for the right eye and an image for the left eye are formed and switched for each field, cross talk occurs, that is, the image for the right eye enters the left eye, and the image for the left eye enters the right eye. Significant cross talk results in a double image. Further, since an image for the right eye and an image for the left eye are switched by time division, a slow switching speed causes flicker to occur. In order to eliminate crosstalk and flicker, the high-speed response is necessary not only for liquid crystal cells for polarization control, but also for liquid crystal light valves for image formation.

The response of a liquid crystal light valve necessary for high definition, high quality image display is no more than 8 msec for each tone, and desirably a liquid crystal light valve has a response of 5 msec or less. A practical liquid crystal light valve used in a projection-type display apparatus is constituted from TN mode liquid crystal or VA mode liquid crystal, whose response speed is 10 msec or more. Therefore, it has been difficult to secure a response of 5 msec or less with such a liquid crystal light valve.

SUMMARY OF THE INVENTION

Therefore, with the foregoing in mind, it is an object of the present invention to provide a stereoscopic display apparatus that is configured by one projection-type display apparatus so as to display stereoscopic video with very little cross talk of images for the right eye and for the left eye, and no flicker, without needing high-speed response for the light valves.

A projection-type display apparatus of the present invention includes: a light source; an illumination optical system that condenses light from the light source, and forms a light beam for the right eye and a light beam for the left eye, the light beams entering an illumination area at different angles from each other; a color separating element that separates the light beams from the illumination optical system into a blue light beam, a green light beam, and a red light beam; three liquid crystal light valves that receive the light beams of the respective colors for the right eye and for the left eye that are separated by the color separating element, and form image lights for the right eye and for the left eye according to video signals for the right eye and for the left eye; a color combining element that receives the image lights for the right eye and for the left eye exiting from the liquid crystal light valves, and combines the blue, green, and red light beams; a wavelength-selective polarization rotating element that rotates a polarization direction of a light beam of a predetermined color from among the light beams combined by the color combining element so as to align the polarization direction with that of a light beam of another color; and a projection lens that magnifies and projects a light that has passed through the wavelength-selective polarization rotating element.

Each of the liquid crystal light valves includes a plurality of pixels that are arranged in a matrix, each of the pixels being composed of a right eye image pixel and a left eye image pixel, an incident side microlens array that causes the light beams for the right eye and for the left eye to pass respectively through the right eye image pixels and the left eye image pixels, and an exit side microlens array that condenses the light beams that have passed through the pixels. The projection lens includes a polarized light separating element that causes polarization directions of the image light for the right eye and the image light for the left eye to be orthogonal to each other.

With the projection-type display apparatus having the above configuration, it is possible to obtain continuously projection images for the right eye and for the left eye without switching image light using time division, and perform stereoscopic display with no flicker. Magnification projection is performed using one projection lens, thus achieving a projection-type display apparatus that can be installed easily and can perform stable stereoscopic display. Furthermore, the configuration is achieved using three liquid crystal light valves and one projection lens, and thus a small projection-type display apparatus for bright stereoscopic display can be constituted.

DETAILED DESCRIPTION OF THE INVENTION

Based on the configuration described above, a projection-type display apparatus of the present invention can be modified as follows.

Specifically, it is possible to adopt a configuration in which the exit side microlens array includes a first microlens array and a second microlens array that are arranged in an optical path direction.

Alternatively, it is possible to adopt a configuration in which the exit side microlens array is constituted by a single microlens array. The single microlens array arranged on the exit side of pixels causes diffused light that has passed through the pixels to be condensed, and to enter a projection lens. Thereby, compared to the case of using two microlens arrays, although the efficiency of condensing the light beams for images for the right eye and for the left eye falls slightly in the polarized light separating element, liquid crystal panels can be constituted inexpensively.

It is possible to adopt a configuration in which the polarized light separating element is positioned in a vicinity of a position where a principal ray of the projection lens intersects an optical axis.

It is possible to adopt a configuration in which a light transmission area of the polarized light separating element is divided into two areas corresponding to respective passing areas of the image light for the right eye and the image light for the left eye, one of the two areas comprises a half wave plate that rotates a polarization direction and a first polarizing element that transmits polarized light from the half wave plate, and the other of the two areas comprises a second polarizing element whose absorption axis is orthogonal to an absorption axis of the first polarizing element.

It is possible to adopt a configuration in which the first and second polarizing elements of the polarized light separating element are polarizing films that are attached to quartz or sapphire glass.

It is possible to adopt a configuration in which the polarized light separating element includes a quarter wave plate that converts linearly polarized light into circularly polarized light.

It is possible to adopt a configuration in which the first and second polarizing elements of the polarized light separating element are inorganic polarizing plates.

It is possible to adopt a configuration in which a light transmission area of the polarized light separating element is divided into two areas corresponding to respective passing areas of the image light for the right eye and the image light for the left eye, and one of two areas comprises a half wave plate that rotates a polarization direction.

It is possible to adopt a configuration in which the exit side microlens array is a cylindrical lens array, in which each cylindrical lens has a curvature in an arrangement direction of the right eye image pixels and the left eye image pixels.

It is possible to adopt a configuration in which the right eye image pixels and the left eye image pixels of each of the liquid crystal light valves are arranged in a short side direction of an aspect ratio of the liquid crystal light valves.

It is possible to adopt a configuration in which each of the liquid crystal light valves is constituted from TN mode liquid crystal or VA mode liquid crystal.

Hereinafter, the present invention will be described by way of illustrative embodiments with reference to the drawings.

Embodiment 1

Figure 1:
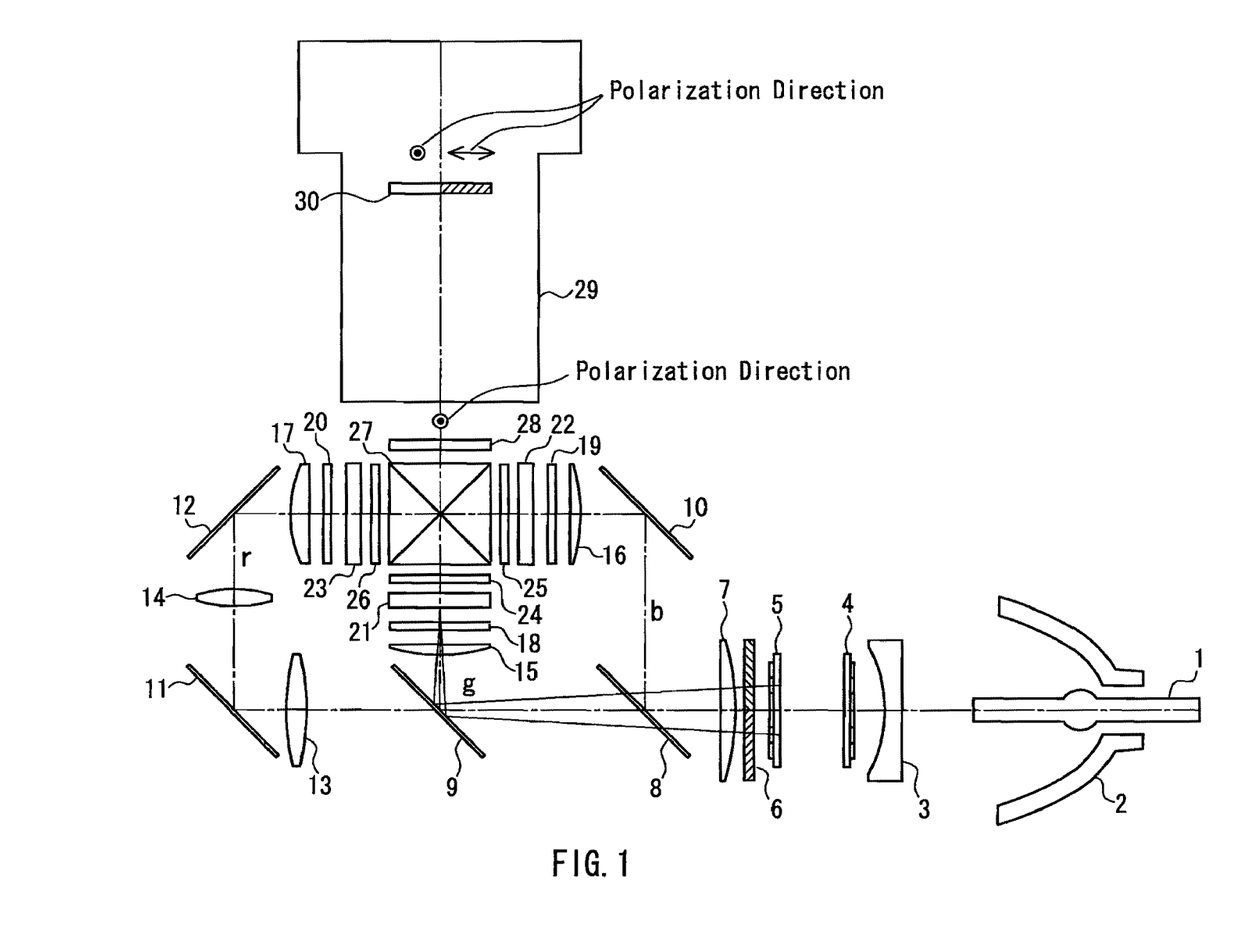
FIG. 1 is a plan view showing the configuration of a projection-type display apparatus according to Embodiment 1 of the present invention.

FIG. 1 is a plan view showing the configuration of a projection-type display apparatus according to Embodiment 1 of the present invention. Note that a part of the configuration is shown in cross section. A TN mode or VA mode transmission-type liquid crystal panel is used for each liquid crystal light valve.

A discharge lamp 1 is used as a light source, and is arranged inside a reflecting mirror 2. A concave lens 3 is arranged on the condensing side of the reflecting mirror 2, and on the exit side of the concave lens, an illumination optical system is arranged, which is constituted by first and second lens array plates 4 and 5, a polarization converting optical element 6, and a condensing lens 7.

An optical system on the exit side of the condensing lens 7 is constituted by a blue reflection dichroic mirror 8, a green reflection dichroic mirror 9, reflection mirrors 10, 11, and 12, relay lenses 13 and 14, field lenses 15, 16, and 17, incident side polarizing plates 18, 19, and 20, liquid crystal panels 21, 22, and 23, exit side polarizing plates 24, 25, and 26, a color combining prism 27, and a wavelength-selective polarization rotating element 28. The color combining prism 27 is constituted by a red reflection dichroic mirror and a blue reflection dichroic mirror. The light from the wavelength-selective polarization rotating element 28 is projected by a projection lens 29. A polarized light separating element 30 is disposed in the projection lens 29.

The configuration of this projection-type display apparatus and the operation thereof are described below in detail. The light emitted from the discharge lamp 1 is condensed by the reflecting mirror 2, and converted into substantially parallel light by the concave lens 3. The light converted into substantially parallel light enters the first lens array plate 4 that is constituted by a plurality of lens elements. The light beam that has entered the first lens array plate 4 is divided into a large number of light beams. Each lens element of the first lens array plate 4 has an aperture shape that is similar to the shape of the liquid crystal panels 21, 22, and 23. The divided large number of light beams converge onto the second lens array plate 5 that is constituted by a plurality of lenses. The focal length of the lens elements of the second lens array plate 5 is determined such that the first lens array plate 4 and the liquid crystal panels 21, 22, and 23 are substantially in a conjugate relationship.

The light that exits from the second lens array plate 5 enters the polarization converting optical element 6. The polarization converting optical element 6 is constituted by a polarized light separating prism and a half wave plate, and converts natural light from the lamp into light having one polarization direction. The light from the polarization converting optical element 6 enters the condensing lens 7. The condensing lens 7 is used for illuminating, in a superimposing manner, the liquid crystal panels 21 and 22 and 23 with light exiting from the lens elements of the second lens array plate 5.

Light exiting from the condensing lens 7 is separated into blue, green, and red light by the blue reflection dichroic mirror 8 and the green reflection dichroic mirror 9 that constitute a color separating element. The green light passes through the field lens 15 and the incident side polarizing plate 18, and enters the liquid crystal panel 21. The blue light is reflected by the reflection mirror 10, thereafter passes through the field lens 16 and the incident side polarizing plate 19, and enters the liquid crystal panel 22. The red light is transmitted and refracted by the relay lenses 13 and 14, reflected by the reflection mirrors 11 and 12, then passes through the field lens 17 and the incident side polarizing plate 20, and enters the liquid crystal panel 23.

The three liquid crystal panels 21, 22, and 23 are constituted using an active matrix system, and change the polarization state of the entering light in accordance with the control of the voltage applied to pixels according to a video signal. The incident side polarizing plates 18, 19, and 20 and the exit side polarizing plates 24, 25, and 26 are arranged on both sides of the liquid crystal panel 21, 22, and 23 respectively, such that the transmission axes are orthogonal to each other. The combinations of the liquid crystal panels 21, 22, and 23, the incident side polarizing plates 18, 19, and 20, and the exit side polarizing plates 24, 25, and 26 constitute the liquid crystal light valves for the respective color lights. The color lights are modulated by the respective liquid crystal light valves, thus forming green, blue, and red images for the right eye and for the left eye.

The respective color lights that have passed through the exit side polarizing plates 24, 25, and 26 enter the color combining prism 27. In the color combining prism 27, red light and blue light are reflected respectively by the red reflection dichroic mirror and the blue reflection dichroic mirror, and combined with green light. The liquid crystal light valves for respective color lights are constituted such that the reflecting surfaces of the color combining prism 27 transmit and reflect green light as p-polarized light, and red and blue light as s-polarized light. The reason for using green light in the p-polarized light state, and blue and red light in the s-polarized light state is because transmittance or reflectance can be increased in a wide band due to the spectral characteristics with respect to respective color lights.

The combined light passing through the color combining prism 27 enters the wavelength-selective polarization rotating element 28. The wavelength-selective polarization rotating element 28 is constituted by laminating a retardation film so as to have a function of rotating the polarization direction of the light in a specified wavelength band. The wavelength-selective polarization rotating element 28 rotates the polarization direction of green light 90 degrees, and does not rotate the polarization direction of red and blue light. Accordingly, the polarization direction of green, blue, and red light becomes the s-polarized light direction, and the light enters the projection lens 29. The light entering the projection lens 29 is separated by the polarized light separating element 30 such that the polarization direction of image light for the right eye and the polarization direction of image light for the left eye are orthogonal to each other. The image light for the right eye and the image light for the left eye is magnified and projected on a screen (not shown). Here, p-polarized light exiting from the diagonally shaded portion of the polarized light separating element 30 is assumed to be image light for the left eye. The projection image that is magnified and projected is observed as a stereoscopic display image using polarization glasses.

Figure 2A:
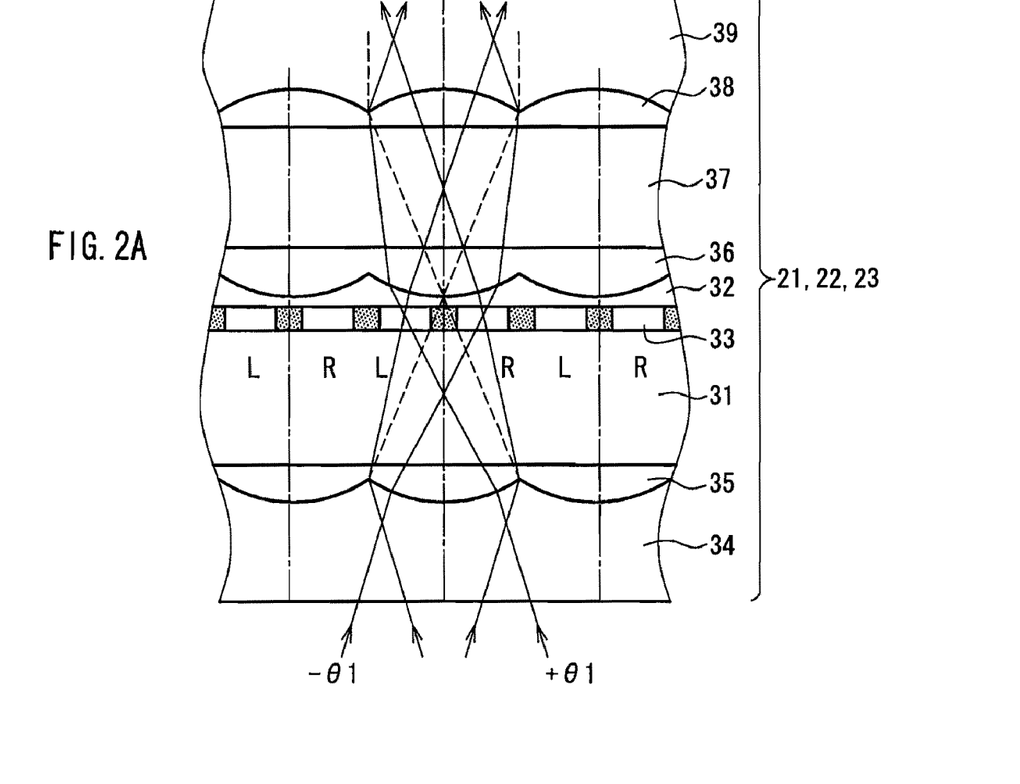
FIG. 2A is a cross-sectional view showing a configuration of a liquid crystal panel used in the projection-type display apparatus.
Figure 2B:
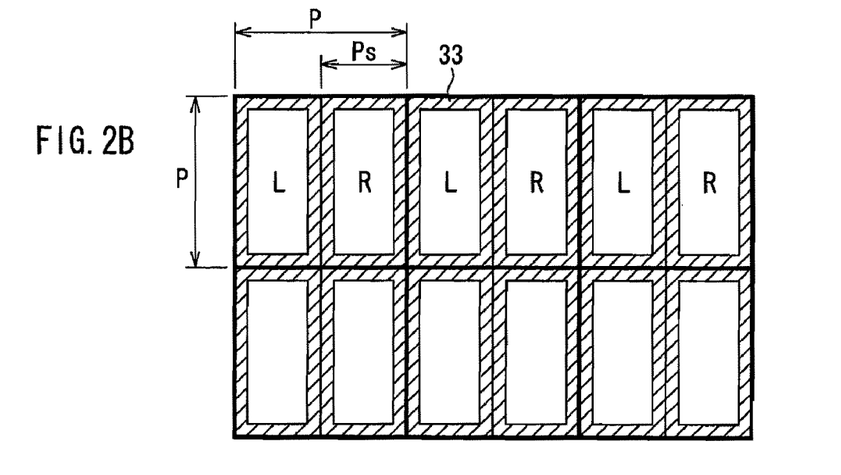
FIG. 2B is a front view showing the pixel configuration viewed from an incident side surface of the liquid crystal panel.

FIGS. 2A and 2B show the configuration of the liquid crystal panels 21, 22, and 23, where FIG. 2A is a cross-sectional view showing a part of the configuration, and FIG. 2B is a partial plan view showing a pixel arrangement. Each of the liquid crystal panels 21, 22, and 23 has pixels 33 having a matrix structure, and is constituted by a liquid crystal layer that is sandwiched and enclosed by glass substrates 31 and 32, and a thin-film transistor that is arranged in each of the pixels 33. The pixels 33 are arranged at a pixel pitch P as shown in FIG. 2B. Each of the pixels 33 includes a right eye image pixel R for forming image light for the right eye, and a left eye image pixel L for forming image light for the left eye. The right eye image pixel R and the left eye image pixel L are arranged at a pitch Ps(=P/2) in the longitudinal direction of the aspect ratio of the liquid crystal panel. A microlens array 35 and cover glass 34 are arranged on the incident side of the pixels 33, and a first microlens array 36, a second microlens array 38, and cover glass 37 and 39 are arranged on the exit side of the pixels 33.

The microlenses of the microlens arrays 35, 36, and 38 are formed at the pitch P in a matrix in one-to-one correspondence with the pixels 33. The microlenses of the microlens array 35 on the incident side cause light entering the liquid crystal panel in the direction of an incident angle +θ1 to condense onto the left eye image pixels L, and light entering the liquid crystal panel in the direction of an incident angle −θ1 to condense onto the right eye image pixels R, so that the light is transmitted selectively. A focal length f1 (equivalent air value) of the microlens array 35 on the incident side is determined based on Equation 1.

$$F1=(P/2)/\tan(2\theta 1) \qquad \text{(Equation 1)}$$

The first microlens array 36 on the exit side is arranged in the vicinity of the pixels 33, and a focal length f2 thereof is set such that an image in the vicinity of the microlens array 35 on the incident side is formed in the vicinity of the second microlens array 38. A focal length f3 of the second microlens array 38 is set substantially to n. The solid lines shown in FIG. 2A show light that enters at ±θ1, and the dashed lines show light in the case where parallel light enters. Diffused light that has passed through the pixels 33 is condensed efficiently by the first and second microlens arrays 36 and 38 on the exit side, and enters the projection lens 29. If p-polarized light exiting from the polarized light separating element 30 is assumed to be image light for the left eye, red and blue light along optical paths thereof is reflected by the combining prism 27, and the direction of the light is inverted with respect to the green light beam. Accordingly, video signals applied to the liquid crystal panels 21, 22, and 23 are set such that pixel light obtained by modulating light that is to be condensed onto the diagonally shaded portion of the polarized light separating element 30 becomes image light for the left eye.

Figure 3:
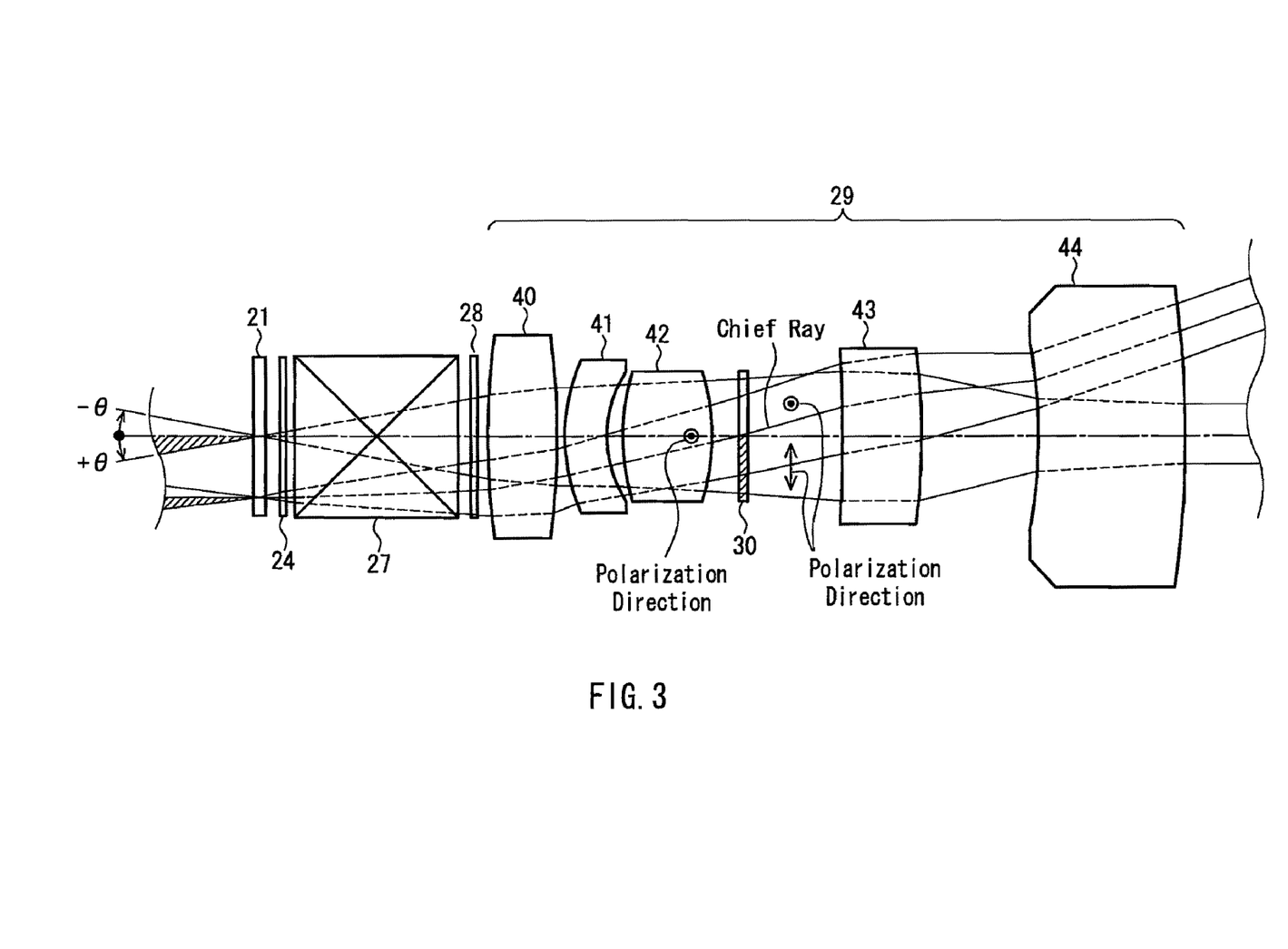
FIG. 3 is a plan view showing the configuration of a projection lens used in the projection-type display apparatus and light paths.

FIG. 3 shows the configuration of the projection lens, and light rays along an optical path of green light. The projection lens 29 is a telecentric zoom lens that is constituted by a lens group including five lenses 40, 41, 42, 43, and 44, and the polarized light separating element 30. FIG. 3 shows on-axis light rays and off-axis light rays exiting from the liquid crystal panel 21, and pass through the exit side polarizing plate 24, the color combining prism 27, the wavelength-selective polarization rotating element 28, and the projection lens 29. The polarized light separating element 30 is arranged in the vicinity of the position where on-axis and off-axis principal rays intersect.

The position where the principal rays intersect is a position where light beams with an incident angle in the −θ direction, and light beams with an incident angle in the +θ direction (diagonally shaded portion) are separated. A light beam in the diagonally shaded portion that is irradiated on the liquid crystal panel 21 at an angle in the +θ direction is condensed on the diagonally shaded portion area of the polarized light separating element 30 due to the operation of the microlenses (see diagram 2A) of the liquid crystal panel 21. Here, if the liquid crystal panel 21 is not provided with the microlenses on the incident side and the exit side, a light beam in the diagonally shaded portion that is illuminated at an angle in the +θ direction is condensed on the area that is on the side opposite to the diagonally shaded portion of the polarized light separating element 30.

Therefore, the light beams that are irradiated on the liquid crystal panel at the incident angles +θ1 and −θ1 as shown in FIG. 2A respectively pass through the left eye image pixel L of the liquid crystal panel or the right eye image pixel R thereof selectively. Although the light beams that exit from the pixels 33 due to the operation of the microlens array 35 on the incident side become diffused light, the light beams are condensed due to the operation of the microlens arrays 36 and 38 on the exit side. Accordingly, image light for the right eye and image light for the left eye are separated at the position of the polarized light separating element 30 of the projection lens 29. Further, even if the polarized light separating element 30 that has the boundary portion that divides the area into two is arranged at this position, this boundary portion is not noticeable in an image that is projected on the screen.

Figure 4:
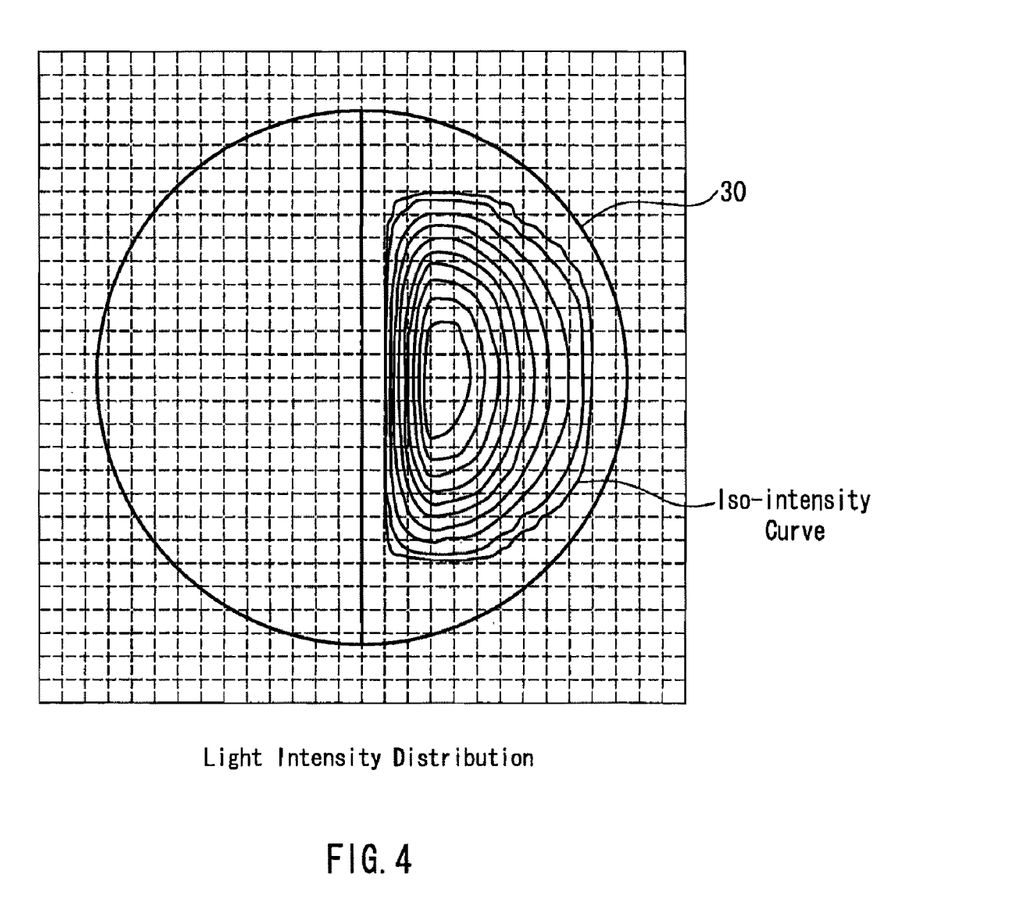
FIG. 4 is a diagram showing light intensity distribution on a polarized light separating element used in the projection-type display apparatus.

Light intensity distribution on the polarized light separating element 30 is shown in FIG. 4. The light intensity distribution shows the distribution on the incident surface of the polarized light separating element 30. With regard to the light that passes through the left eye image pixels L, an effective light beam that is emitted from the discharge lamp 1, exits from the projection lens 29, and reaches the screen is simulated using a luminous flux density method. As iso-intensity curves, curves that indicate intensities from 100% to 10% in 10% increments, and a curve that indicates an intensity of 5% are shown, with the maximum intensity being set to 100%.

The main parameters are set as follows: the arc length of the lamp is 1.1 mm; the F number of the illumination optical system is 2.7; θ1 is 5.3°; the number of pixels of the liquid crystal panel is horizontal×vertical=(960×2)×540; the pitch P of the pixels 33 is 17 μm; the pixel pitch Ps of the right eye image pixels R and the left eye image pixels L is 8.5 μm; the aperture ratio of the pixels 33 is 51%; the aperture ratio of the right eye image pixels R and the left eye image pixels L is 25.5%; the focal length of the microlens array 35 on the incident side is 46 μm; the focal length f2 of the first microlens array 36 on the exit side is 34 μm; the focal length f3 of the second microlens array 38 on the exit side is 49 μm; and the F number of the projection lens is 1.9. It should be noted that the focal lengths are shown as equivalent air lengths.

Although light that exits from the pixels of the liquid crystal panel becomes diffused light due to the microlens array 35 on the incident side, the light is condensed efficiently on the projection lens 29 due to the microlens arrays 36 and 38 on the exit side. If the luminous flux in the diagonally shaded portion area of the polarized light separating element 30 is assumed to be 100%, the luminous flux in the other area will be 0%. Specifically, it can be seen that light beams that have passed through the left eye image pixels L are condensed only onto the diagonally shaded portion area of the polarized light separating element 30, and the light that passes selectively through the right eye image pixel R is condensed only onto the other area of the polarized light separating element 30, so that image light for the left eye and image light for the right eye are completely separated.

Figure 5A:
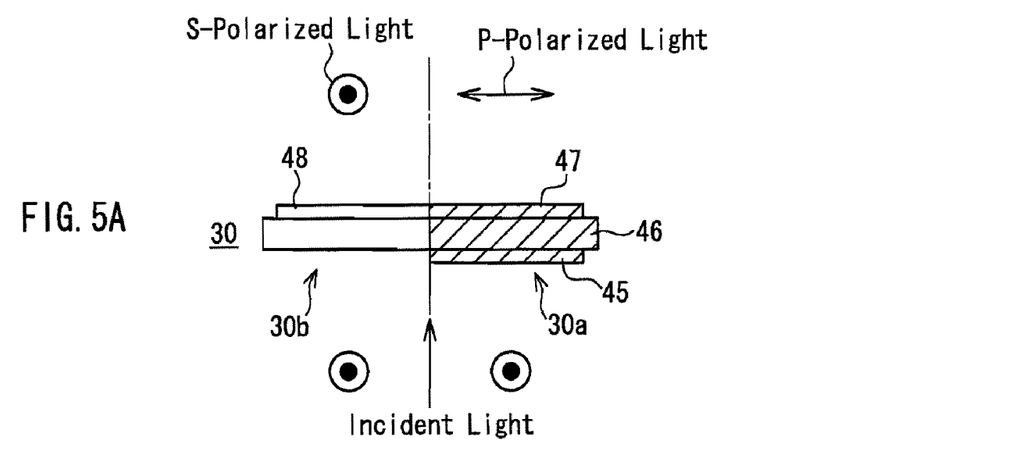
FIG. 5A is a plan view showing the polarized light separating element.
Figure 5B:
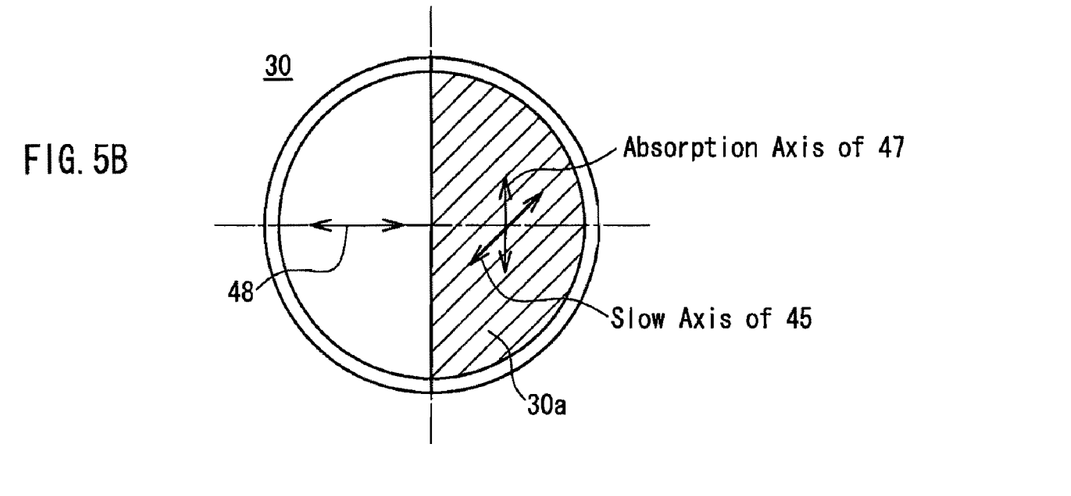
FIG. 5B is a front view as seen from an incident side surface of the polarized light separating element.

The configuration of the polarized light separating element 30 is shown in FIGS. 5A and 5B. FIG. 5A is a plan view, and FIG. 5B is a front view as seen from the incident side surface of the polarized light separating element 30. The polarized light separating element 30 is formed by attaching a half wave plate 45 and a first polarizing plate 47 to a glass substrate 46 in a diagonally shaded portion area 30a, which is one of the two divided areas on the glass substrate 46, and attaching a second polarizing plate 48 to the glass substrate 46 in the other area 30b. The half wave plate 45 rotates a polarization direction 90 degrees, and the second polarizing plate 48 has an absorption axis that is orthogonal to the absorption axis of the first polarizing plate 47. The half wave plate 45 is a stretched resin film whose slow axis is at 45 degrees. The first polarizing plate 47 is a polarizing film whose absorption axis is at 90 degrees, and the second polarizing plate 48 is a polarizing film whose absorption axis is at 0 degrees. In order to dissipate efficiently heat of the light that is absorbed by the polarizing plates, it is desirable to use a quartz or sapphire substrate whose heat conductivity is higher than that of glass, instead of the glass substrate 46.

In the diagonally shaded portion area 30a, s-polarized light that enters the polarized light separating element 30 is rotated by the half wave plate 45, and an unnecessary polarized light component thereof is absorbed by the first polarizing plate 47, and thus polarized light including only a p-polarized light component exits. Light including only an s-polarized light component exits from the other area 30b.

Therefore, a p-polarized light beam that selectively passes through the left eye image pixel L, and passes through the diagonally shaded portion area 30a of the polarized light separating element 30 is magnified and projected on the screen as image light for the left eye. Further, an s-polarized light beam that selectively passes through the right eye image pixel R, and passes through the other area 30b of the polarized light separating element 30 is magnified and projected on the screen as image light for the right eye. A stereoscopic image can be observed with polarization glasses configured to use s-polarized light as image light for the right eye, and p-polarized light as image light for the left eye.

The polarized light separating element 30 may have a configuration in which a quarter wave plate that converts linearly polarized light that exits from the polarizing plates 47 and 48 into circularly polarized light is arranged. Linearly polarized light beams that are orthogonal to each other respectively are converted into right-handed circularly polarized light and left-handed circularly polarized light by the quarter wave plate, and if polarization glasses using a circular polarization system are utilized, it is possible to reduce cross talk that occurs due to the difference in polarization direction angles between the polarized light separating element and the polarization glasses. Further, an inorganic polarizing plate using a wire grid system or the like can be used as the polarizing plates of the polarized light separating element 30. Although using an inorganic polarizing plate is expensive, a cooling system for dissipating heat of the polarizing plate will be unnecessary. An inorganic wave plate that uses optical crystal such as quartz also may be used as the half wave plate or the quarter wave plate as well, rather than a stretched film. If an inorganic wave plate is used, the durability of the wave plate can be improved.

Furthermore, there is no limitation to a configuration in which the first and second polarizing plates 47 and 48 are arranged in the polarized light separating element 30. Specifically, a configuration may be adopted in which only a half wave plate that rotates polarized light is attached to one of the two divided areas of the glass substrates 46 since image light for the right eye and image light for the left eye can be separated completely on the polarized light separating element 30. Although the degree to which the image light for the right eye and for the left eye is polarized slightly falls, since the polarizing plates are not arranged, light is not absorbed, and thus heat dissipation and a cooling system are unnecessary.

As described above, the projection-type display apparatus of the present embodiment includes liquid crystal panels, each of which has a microlens array on the incident side that causes light beams that enter at different angles from each other to pass respectively through pixels for the right eye and pixels for the left eye, and microlens arrays on the exit side that condense diffused light that exits from the pixels, and a projection lens provided with a polarized light separating element. Thereby, image light for the right eye and image light for the left eye is projected continuously without being switched using time division, and thus it is possible to perform stereoscopic display with very little cross talk, and no flicker.

According to the present embodiment, since natural light from the light source is converted efficiently into linearly polarized light, liquid crystal panels are illuminated uniformly with the light, and the liquid crystal panels for green, red, and blue light provided with pixels for the right eye and for the left eye are used, a bright, uniform, and high definition projection image can be obtained. Since this device is one projection-type display apparatus constituted using one projection lens, installation adjustment is not necessary, and the device can display stable projection images. Furthermore, if liquid crystal panels in which microlenses for stereoscopic image (3D) display are formed are used in a projection-type display apparatus for two-dimensional image (2D) display, and a polarized light separating element is arranged in a projection lens, a projection-type display apparatus with which 2D/3D display is possible can be easily constituted.

Embodiment 2

Figure 6:
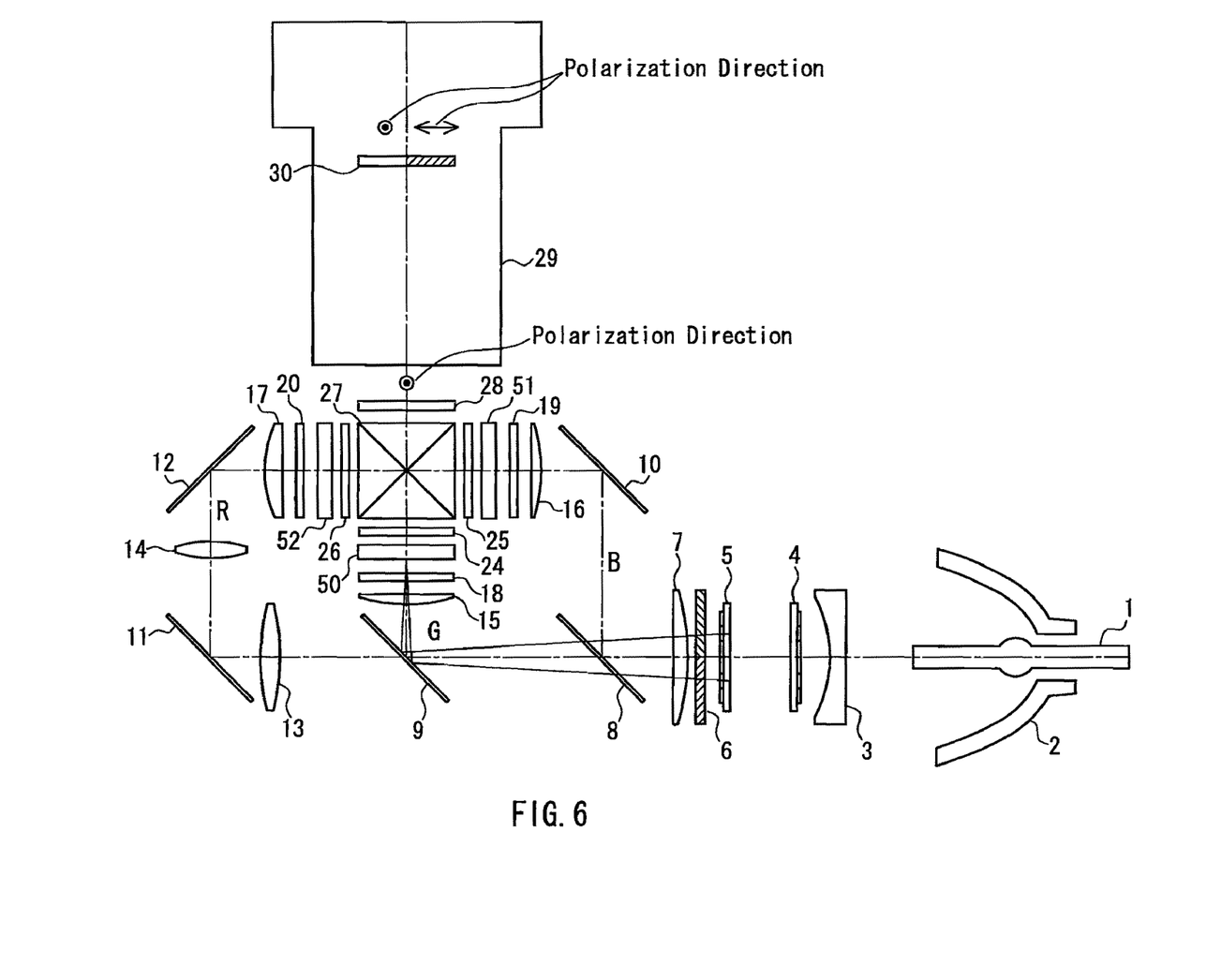
FIG. 6 is a plan view showing the configuration of a projection-type display apparatus according to Embodiment 2 of the present invention.

The overall configuration of a projection-type display apparatus according to Embodiment 2 of the present invention is shown in FIG. 6. In this projection-type display apparatus, a TN mode or VA mode transmission-type liquid crystal panel is used for each liquid crystal light valve.

This projection-type display apparatus basically has the same configuration as that of the projection-type display apparatus according to Embodiment 1 shown in FIG. 1. Therefore, the same reference numerals are given to the same elements, and a redundant description is omitted. The present embodiment differs from Embodiment 1 in the configuration of liquid crystal panels 50, 51, and 52. Below is a description of the configuration of the liquid crystal panels, and the operation thereof.

Figure 7:
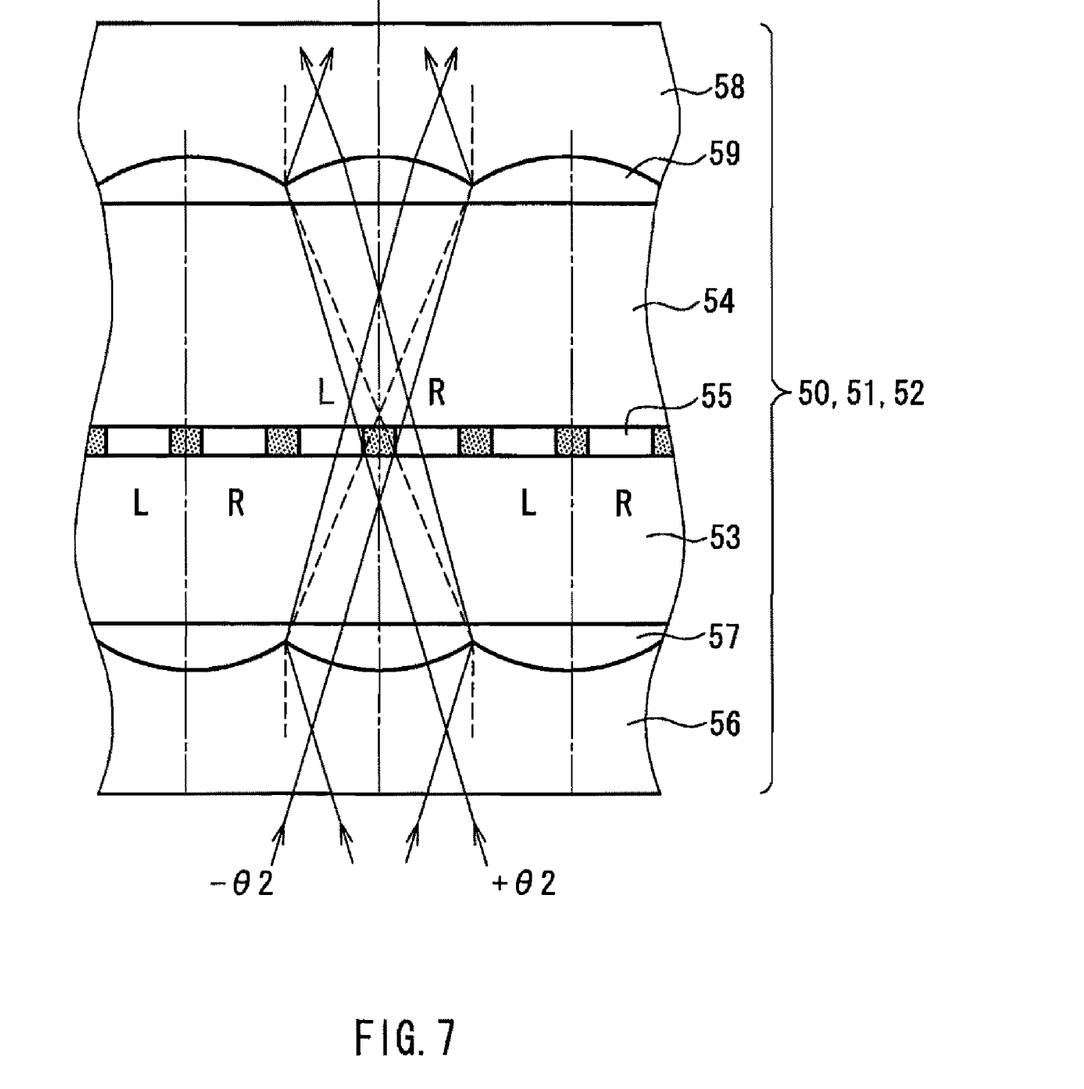
FIG. 7 is a cross-sectional view showing the configuration of a liquid crystal panel used in the projection-type display apparatus.

FIG. 7 is a cross-sectional view showing the planar configuration of the liquid crystal panels 50, 51, and 52. Each of the liquid crystal panels 50, 51, and 52 has pixels 55 having a matrix structure, and is constituted by a liquid crystal layer that is sandwiched and enclosed by glass substrates 53 and 54, and a thin-film transistor arranged in each of the pixels 55. The pixel arrangement is the same as that shown in FIG. 2B, and the pixels 55 are arranged at the pixel pitch P. The right eye image pixel R and the left eye image pixel L of each of the pixels 55 are arranged at the pitch Ps(=P/2) in the long side direction of the aspect ratio of the liquid crystal panel. A microlens array 57 and cover glass 56 are arranged on the incident side of the pixels 55 of the liquid crystal panels 50, 51, and 52, and a microlens array 59 and cover glass 58 are arranged on the exit side of the pixels 55.

The microlenses of the microlens arrays 57 and 59 are formed at the pitch P in a matrix in one-to-one correspondence with the pixels 55. The microlens array 57 causes light that enters the liquid crystal panel in the direction of an incident angle +θ2 to condense onto the left eye image pixels L, and light that enters the liquid crystal panel in the direction of an incident angle −θ2 to condense onto the right eye image pixels R, so that the light is transmitted selectively. A focal length f1 (equivalent air value) of the microlens array 57 is determined based on Equation 1, which is the same as in the case of the configuration shown in FIG. 2A.

A focal length f3 of the microlens array 59 on the exit side is set to an approximate distance between the principal plane of the microlens array 59 and the pixel layer. In FIG. 7, f3 is shown as being substantially f1. The solid lines showing light beams in FIG. 7 show light that enters at ±θ2, and the dashed lines show light in the case where parallel light enters. The diffused light that has passed through the pixels 55 is condensed efficiently by the microlens array 59 on the exit side, and enters the projection lens.

Figure 8:
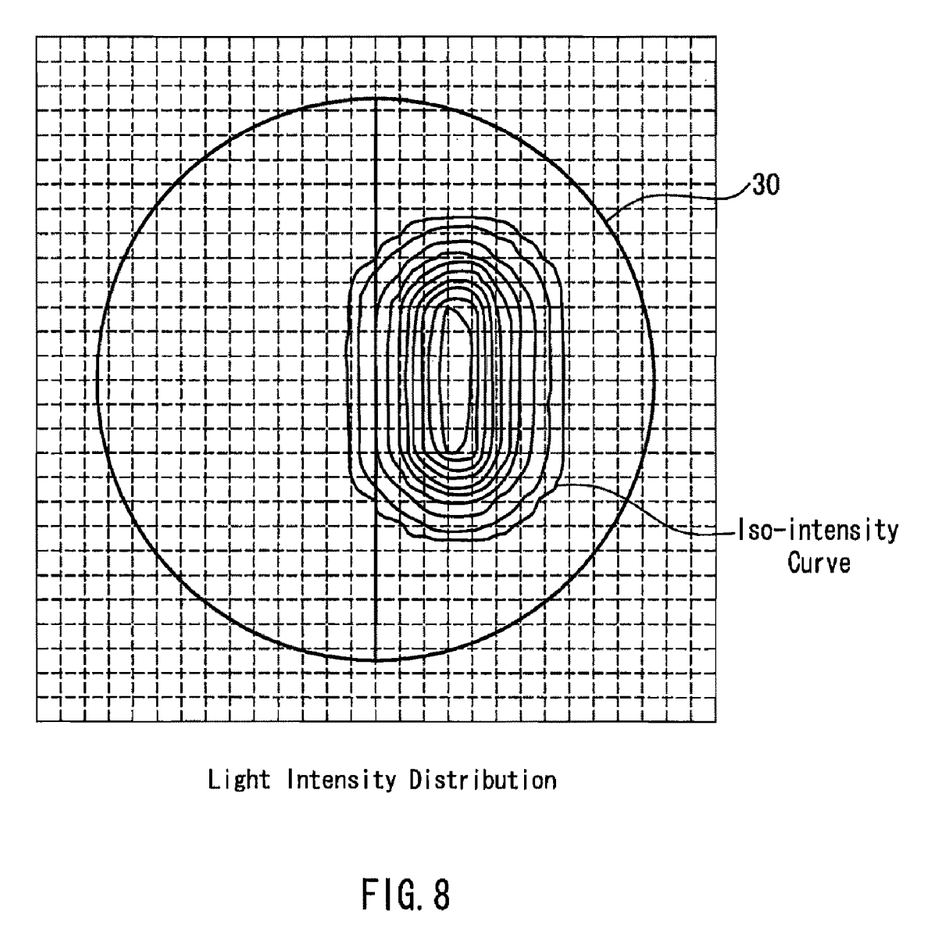
FIG. 8 is a diagram showing light intensity distribution on a polarized light separating element used in the projection-type display apparatus.

Light intensity distribution on the polarized light separating element 30 is shown in FIG. 8. The light intensity distribution shows the distribution on the incident side surface of the polarized light separating element 30. With regard to the light that passes through the left eye image pixels L, an effective light beam that is emitted from the discharge lamp 1, exits from the projection lens 29, and reaches the screen is simulated using a luminous flux density method. As iso-intensity curves, curves that indicate intensities from 100% to 10% in 10% increments, and a curve that indicates an intensity of 5% are shown, with the maximum intensity being set to 100%. The main parameters are the same as those in the simulation in the case of FIG. 4.

Although the light that exits from the pixels 55 of the liquid crystal panels 50, 51, and 52 becomes diffused light due to the microlens array 57, the light is condensed efficiently onto the projection lens 29 by the microlens array 59 on the exit side. If the luminous flux in the diagonally shaded portion area of the polarized light separating element 30 is assumed to be 100%, the luminous flux in the other area will be 4%. Therefore, it can be seen that light beams that have passed through the left eye image pixels L are condensed onto the diagonally shaded portion area of the polarized light separating element 30, and the light that passes selectively through the right eye image pixel R is condensed only onto the other area of the polarized light separating element 30, and thus image light for the left eye and image light for the right eye can be separated. The percentage of light beams that selectively pass through the left eye image pixels L, and condense onto the diagonally shaded portion of the polarized light separating element 30 is 73%, compared to the case of FIG. 4. In the case of the configuration using one microlens array on the exit side, although condensing efficiency falls compared to the case where two microlenses are formed, an inexpensive liquid crystal panel can be constituted.

Figure 9A:
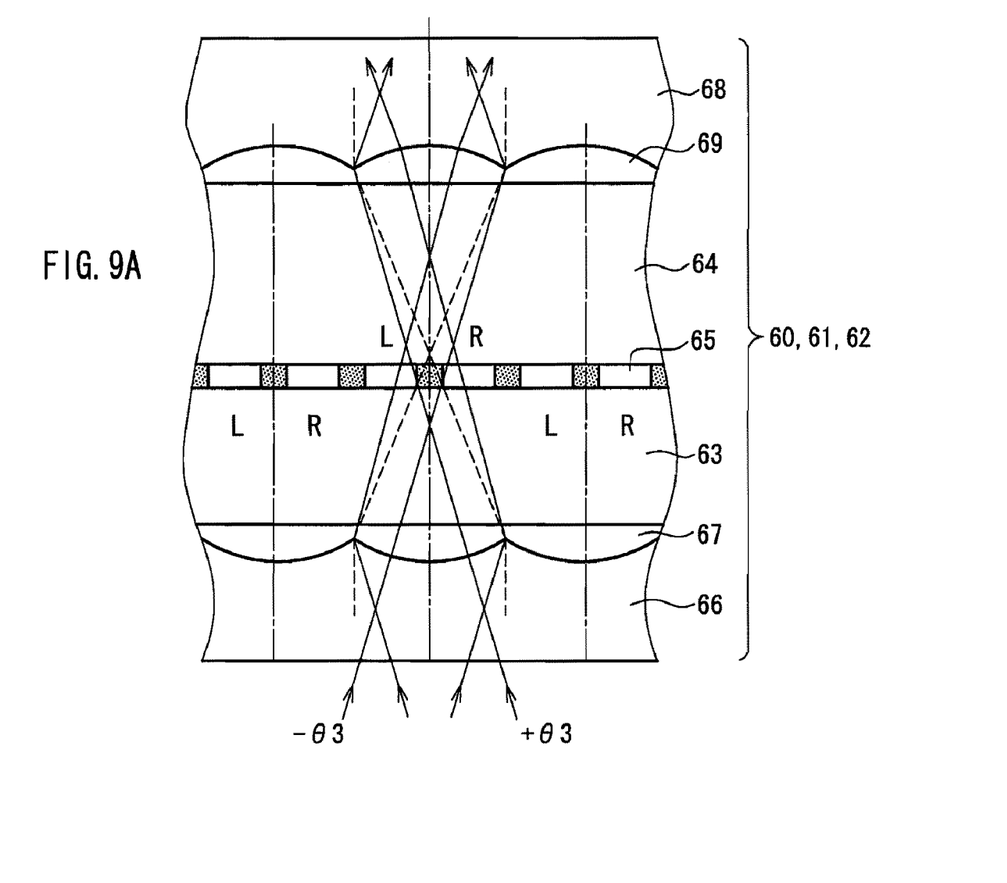
FIG. 9A is a cross-sectional view showing the configuration of another liquid crystal panel used in the projection-type display apparatus.

FIG. 9A shows liquid crystal panels 60, 61, and 62 having another configuration in which a micro cylindrical lens array is arranged on the exit side.

Each of the liquid crystal panels 60, 61, and 62 has pixels 65 having a matrix structure, and is constituted by a liquid crystal layer that is sandwiched and enclosed by glass substrates 63 and 64, and a thin-film transistor arranged in each of the pixels 65. The pixels 65 are arranged at the pixel pitch P, and the right eye image pixel R and the left eye image pixel L of each of the pixels 65 are arranged at the pitch Ps(=P/2) in the long side direction of the aspect ratio of the liquid crystal panel. A microlens array 67 and cover glass 66 are arranged on the incident side of the pixels 65 of the liquid crystal panels 60, 61, and 62, and a micro cylindrical lens array 69 and cover glass 68 are arranged on the exit side of the pixels 65.

Figure 9B:
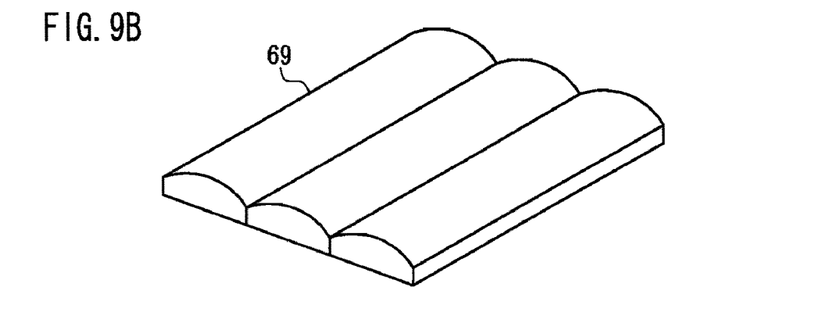
FIG. 9B is a perspective view showing the configuration of a micro cylindrical lens array of the liquid crystal panel.

The difference from the configuration shown in FIG. 7 is that the microlens array on the exit side is constituted by the single micro cylindrical lens array 69. FIG. 9B shows a perspective view of the micro cylindrical lens array 69. The micro cylindrical lens array 69 on the exit side includes lenses that have a curvature in the arrangement direction of the right eye image pixels R and the left eye image pixels L, and the focal length in the direction having a curvature is 46 μm. The solid lines showing light beams in FIG. 9A show light that enters at ±θ3, and the dashed lines show light in the case where parallel light enters. Diffused light that has passed through the pixels 65 is condensed by the micro cylindrical lens array 69 on the exit side, and enters the projection lens.

Figure 10:
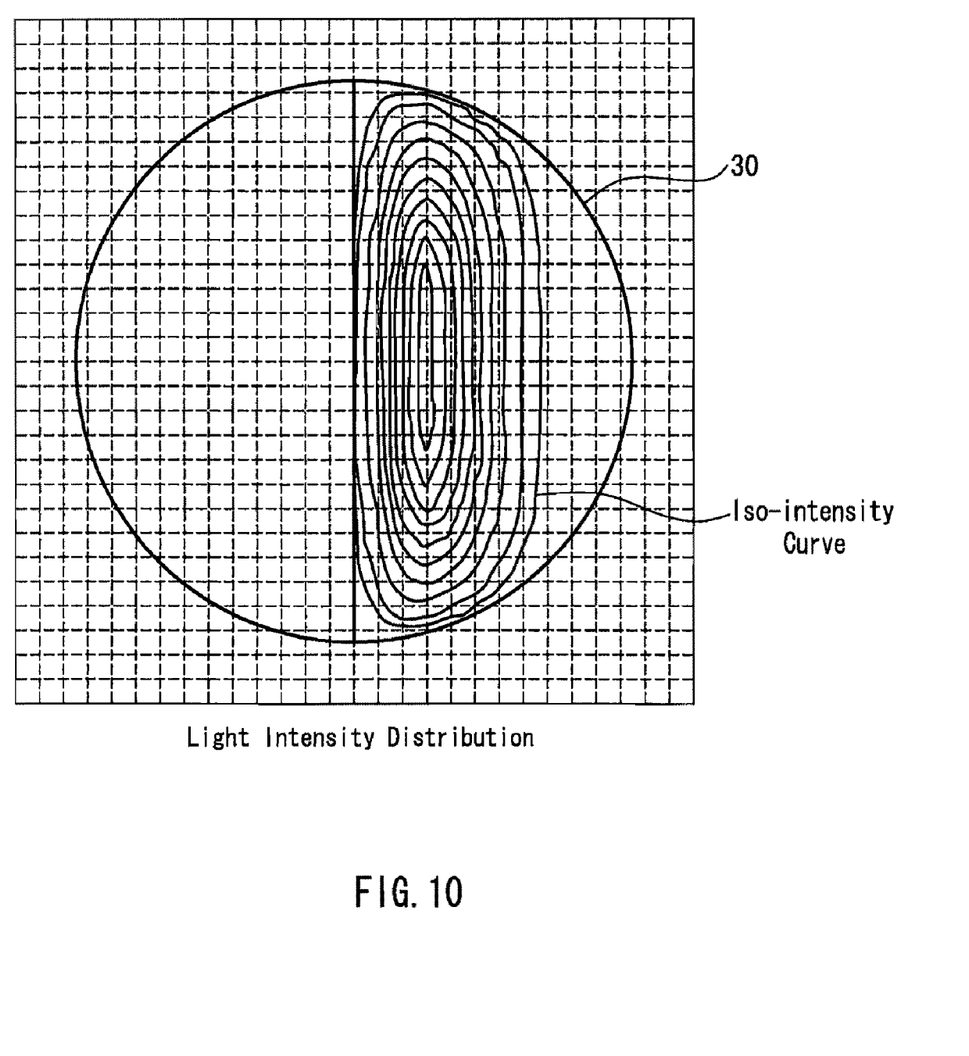
FIG. 10 is a diagram showing light intensity distribution on the polarized light separating element used in the projection-type display apparatus.

Light intensity distribution on the polarized light separating element 30 is shown in FIG. 10. The light intensity distribution shows the distribution on the incident side surface of the polarized light separating element 30. With regard to the light that passes through the left eye image pixels L, an effective light beam that is emitted from the lamp, exits from the projection lens, and reaches the screen is simulated using a luminous flux density method. As iso-intensity curves, curves that indicate intensities from 100% to 10% in 10% increments, and a curve that indicates an intensity of 5% are shown, with the maximum intensity being set to 100%. The main parameters are the same as those in the simulation in the case of FIG. 8.

Although the light that exits from the pixels of the liquid crystal panels 60, 61, and 62 becomes diffused light due to the microlens array 67, the light is condensed efficiently onto the projection lens by the micro cylindrical lens array 69 on the exit side. If the luminous flux in the diagonally shaded portion area of the polarized light separating element 30 is assumed to be 100%, the luminous flux in the other area will be 4%, and light beams that have passed through the left eye image pixels L are condensed onto the diagonally shaded portion area of the polarized light separating element 30, and the light that passed selectively through the right eye image pixel R is condensed onto the other area of the polarized light separating element 30, and thus image light for the left eye and image light for the right eye are separated.

By forming the single microlens array on the exit side with cylindrical lenses, less alignment accuracy of the micro lens is required in the direction orthogonal to the arrangement direction of the right eye image pixels R and the left eye image pixels L. Accordingly, an inexpensive liquid crystal panel can be constituted compared to the liquid crystal panel in which a single microlens array is formed on the exit side shown in FIG. 7. Microlens arrays having cylindrical lenses may be used in the liquid crystal panels of the projection-type display apparatus according to Embodiment 1.

In the liquid crystal panels of the projection-type display apparatuses according to Embodiments 1 and 2 above, although the right eye image pixels R and the left eye image pixels L are arranged in the long side direction of the aspect ratio of the liquid crystal panel, a configuration can be adopted in which the pixels are arranged in the short side direction. In this case, if the division direction of the polarized light separating element 30 is changed to the short side direction, similar effects to those in the case where the pixels are arranged in the long side direction can be obtained. Further, since the number of pixels in the horizontal direction decreases, the panel size in the horizontal direction can be reduced, thus obtaining an advantage that a smaller projection-type display apparatus can be constituted.

As described above, the projection-type display apparatus of the present invention includes liquid crystal panels in each of which a microlens array on the incident side that causes light beams that enter at different angles from each other to respectively pass through pixels for the right eye and pixels for the left eye, and a microlens array on the exit side that condenses diffused light that exits from the pixels are formed, and a projection lens provided with a polarized light separating element. Thereby, image light for the right eye and image light for the left eye is projected continuously without being switched using time division, and thus it is possible to perform stereoscopic display with very little cross talk, and no flicker.

Since natural light from the light source is converted efficiently into linearly polarized light, liquid crystal panels are illuminated uniformly with the light, and the liquid crystal panels for green, red, and blue light provided with pixels for the right eye and for the left eye are used, a bright, uniform, and high definition projection image can be obtained. Since this device is one unit constituted using one projection lens, installation adjustment is not necessary, and the device can display stable projection images. Furthermore, if liquid crystal panels in which microlenses for stereoscopic image (3D) display are formed are used in a projection-type display apparatus for two-dimensional image (2D) display, and a polarized light separating element is arranged in a projection lens, a projection-type display apparatus with which 2D/3D display is possible can be easily constituted.

Note that although the case where TN mode liquid crystal is used for the liquid crystal panels for image formation is described as an example, VA mode liquid crystal can also be used. High-contrast projection images can be realized by using VA mode liquid crystal.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection-type display apparatus, comprising:
   a light source;
   an illumination optical system that condenses light from the light source, and forms a light beam for the right eye and a light beam for the left eye, the light beams entering an illumination area at different angles from each other;
   a color separating element that separates the light beams from the illumination optical system into a blue light beam, a green light beam, and a red light beam;

three liquid crystal light valves that receive the light beams of the respective colors for the right eye and for the left eye that are separated by the color separating element, and form image lights for the right eye and for the left eye according to video signals for the right eye and for the left eye;

a color combining element that receives the image lights for the right eye and for the left eye exiting from the liquid crystal light valves, and combines the blue, green, and red light beams;

a wavelength-selective polarization rotating element that rotates a polarization direction of a light beam of a predetermined color from among the light beams combined by the color combining element so as to align the polarization direction with that of a light beam of another color; and a projection lens that magnifies and projects a light that has passed through the wavelength-selective polarization rotating element, wherein each of the liquid crystal light valves comprises
  a plurality of pixels that are arranged in a matrix, each of the pixels being composed of a right eye image pixel and a left eye image pixel,
  an incident side microlens array that causes the light beams for the right eye and for the left eye to pass respectively through the right eye image pixels and the left eye image pixels, and
  an exit side microlens array that condenses the light beams that have passed through the pixels, and the projection lens comprises a polarized light separating element that causes polarization directions of the image light for the right eye and the image light for the left eye to be orthogonal to each other.

2. The projection type display apparatus according to claim 1,
  wherein the exit side microlens array comprises a first microlens array and a second microlens array that are arranged in an optical path direction.

3. The projection-type display apparatus according to claim 1,
  wherein the exit side microlens array is constituted by single microlens array.

4. The projection-type display apparatus according to claim 1,
  wherein the polarized light separating element is positioned in a vicinity of a position where a principal ray of the projection lens intersects an optical axis.

5. The projection-type display apparatus according to claim 1,
  wherein a light transmission area of the polarized light separating element is divided into two areas corresponding to respective passing areas of the image light for the right eye and the image light for the left eye,
  one of the two areas comprises a half wave plate that rotates a polarization direction and a first polarizing element that transmits polarized light from the half wave plate, and
  the other of the two areas comprises a second polarizing element whose absorption axis is orthogonal to an absorption axis of the first polarizing element.

6. The projection-type display apparatus according to claim 5,
  wherein the first and second polarizing elements of the polarized light separating element are polarizing films that are attached to quartz or sapphire glass.

7. The projection-type display apparatus according to claim 5,
  wherein the polarized light separating element comprises a quarter wave plate that converts linearly polarized light into circularly polarized light.

8. The projection-type display apparatus according to claim 5,
  wherein the first and second polarizing elements of the polarized light separating element are inorganic polarizing plates.

9. The projection-type display apparatus according to claim 1,
  wherein a light transmission area of the polarized light separating element is divided into two areas corresponding to respective passing areas of the image light for the right eye and the image light for the left eye, and
  one of two areas comprises a half wave plate that rotates a polarization direction.

10. The projection-type display apparatus according to claim 1,
  wherein the exit side microlens array is a cylindrical lens array, in which each cylindrical lens has a curvature in an arrangement direction of the right eye image pixels and the left eye image pixels.

11. The projection-type display apparatus according to claim 1,
  wherein the right eye image pixels and the left eye image pixels of each of the liquid crystal light valves are arranged in a short side direction of an aspect ratio of the liquid crystal light valves.

12. The projection-type display apparatus according to claim 1,
  wherein each of the liquid crystal light valves is constituted from TN mode liquid crystal or VA mode liquid crystal.

* * * * *